United States Patent Office 3,474,098
Patented Oct. 21, 1969

3,474,098
PYRAZOLO-(3,4-d) PYRIMIDINES
George H. Hitchings, Yonkers, and Elvira A. Falco, New Rochelle, N.Y., assignors to Burroughs Wellcome & Co. (U.S.A.) Inc., Tuckahoe, N.Y., a corporation of New York
No Drawing. Continuation-in-part of application Ser. No. 524,830, Feb. 3, 1966. This application Aug. 22, 1968, Ser. No. 754,708
Int. Cl. C07d 57/16; A61k 27/00
U.S. Cl. 260—256.5
10 Claims

ABSTRACT OF THE DISCLOSURE

The present invention is directed to compounds of the Formula I

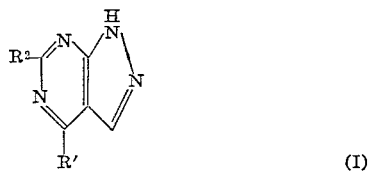

where $R^1$ is amino, hydroxy or mercapto and $R^2$ is hydrogen, mercapto or hydroxy. The compounds are useful intermediates in the preparations of compounds exhibits antitumor activity as well as being useful in the own right as lactic acid bacteria inhibitors, growth inhibitors and as antimetabolites of adenine, guanine and hypoxanthine.

---

The present invention relates to pyrazolo(-3,4-d) pyrimidines.

This application is a continuation-in-part of our United States patent applications Ser. No. 574,576 filed Mar. 29, 1956, now abandoned, Ser. No. 22,394 filed Apr. 15, 1960, now abandoned Ser. No. 221,357, filed Sept. 4, 1962, now abandoned, and Ser. No. 524,830, filed Feb. 3, 1966, now pending.

The compounds of this invention are useful intermediates in the preparation of 4-amino-pyrazolo (-3,4-d) pyrimidine which is useful in inhibiting the growth of Adenocarcinoma 755 in mice and significantly increases the life span of mice with L1210 or L5178 Leukemia.

The compounds of this invention are converted by methods known to those skilled in the art, such methods being disclosed in the examples of this application as well as in the paper, Potential Purine Antagonists I, Synthesis of Some 4,6-Substituted Pyrazolo (-3,4-d) Pyrimidines by Roland K. Robins, Journal of the American Chemical Society, vol. 78, Feb. 20, 1956 pages 784–790 and in the Abstracts of Papers, 128th Meeting of the American Chemical Society, Robins, pages 11N–13N.

It has been found that certain new 1-pyrazolo-(3,4-d) pyrimidines have useful properties as antimetabolites in the biosynthesis of purines. For example, these compounds are antimetabolites of the corresponding purines, such as the 4-amino derivative of adenine, the 4-hydroxy derivative of hypoxanthine and the 4-hydroxy of guanine.

The compounds of the present invention comprise pyrazolo-(3,4-d) pyrimidines of the general Formula I

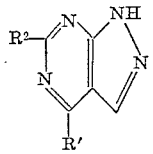

in which $R^1$ is selected from the class consisting of amino hydroxy, and mercapto, and $R^2$ is selected from the class consisting of hydrogen, hydroxy and mercapto.

The compounds may be conveniently synthesized from the new intermediate pyrazole-3,4-dicarboxamide by the treatment of the latter with sodium hypochlorite. The resultant 4,6 - dihydroxyl - 1 - pyrazolo - (3,4-d) pyrimidine (Formula I, $R^1=R^2=OH$) is useful as a growth inhibitor and as an intermediate for the synthesis of further compounds falling within the above general formula in which the hydroxy groups are converted by methods known per se into other groups to give other compounds falling within the above general formula. The compounds likewise inhibit the action of lactic acid bacteria.

The present invention in one aspect, therefore, comprises compounds of the general Formula I and their acid addition salts.

The present invention in another aspect comprises as a new valuable chemical intermediate the compound pyrazole-3,4-dicarboxamide.

The present invention in yet another aspect comprises a method of preparing pyrazolo-(3,4-d) pyrimidines of the general Formula I which comprises reacting pyrazolo-3,4-dicarboxamide with sodium hypochlorate and, if desired, converting one or both of the hydroxy groups of the resulting 4,6-dihydroxy-1-pyrazolo-(3,4-d) pyrimidine to other groups as specified above for $R^1$ and $R^2$.

The invention will now be described with reference to the following examples in which all temperatures are given in degrees centigrade.

EXAMPLE 1

Pyrazole-3,4-dicarboxamide

To 7.5 grams of pyrazole-3,4-dicarboxylic acid there was added 150 ml. of thionyl chloride. This mixture was heated under reflux conditions for ten hours. The thionyl chloride was removed in vacuo and the powdery residue was added, in portions, to a cold, stirred solution of tert-butanol which had been saturated with ammonia at 0°. After the compound had all been added (1 hour), the mixture was allowed to stand for an additional five hours. The precipitate was then removed and boiled with 100 ml. of concentrated ammonium hydroxide solution (1 hour). This solution was allowed to evaporate to dryness on the steam bath, and the residue crystallized from boiling water. The compound thus obtained formed colorless plates melting with decomposition at 327°.

EXAMPLE 2

4,6-dihydroxy-1-pyrazolo-(3,4-d)-pyrimidine

To a cold solution of 16.6 ml. of 0.4 M sodium hypochlorite solution was added (all at once) 500 mg. of pyrazole-3,4-dicarboxamide. The reaction mixture turned pink and then faintly yellow. After standing at 0° for one hour, the reaction mixture was acidified to pH 3 with 2 N hydrochloric acid, and the flocculent precipitate was removed. The compound was recrystallized from boiling water to give colorless needles, in rosettes. The compound does not melt at 320°.

EXAMPLE 3

Preparation of 4-mercapto-6-hydroxy-1-pyrazolo-(3,4-d)-pyrimidine

To 4 grams of the 4,6-dihydroxy compound described in Example 2, there was added 12 grams of phosphorus pentasulfide and 60 ml. of dry pyridine. This mixture was heated for three hours at reflux temperature. The pyridine was removed in vacuo and the residue taken up in cold dilute sodium hydroxide solution. On acidification, there was obtained 3.5 g. of a pale yellow compound. This compound, after crystallization from boiling water, formed yellow plates which do not melt at 360°.

The compound had the following U.V. absorbption spectrum: at pH 1 the maxima are at 255 and 330, m$\mu$, while at pH 11 the peaks are at 255 and 330, m$\mu$.

EXAMPLE 4

Preparation of the 4,6-dimercapto-1-pyrazolo-(3,4-d)-pyrimidine

To the monomercapto compound described in Example 3 (1 gram) there was added 3 grams of phosphorus pentasulfide and 60 ml. of pyridine. This mixture was heated for 16 hours and worked up as described in Example 3. The compound was crystallized from boiling water to give a yellow powder which did not decompose at 320°.

EXAMPLE 5

4-amino-6-hydroxy-1-pyrazolo-(3,4-d)-pyrimidine

To 1.5 grams of the 4-mercapto-6-hydroxy compound described above, there was added 200 ml. of alcohol saturated with ammonia at 0°. This mixture was heated in a closed vessel for 72 hours at 143°. The bomb contents were allowed to evaporate to dryness, and the residue was taken up in cold 1 N hydrochloric acid, and precipitated with dilute ammonium hydroxide solution at about pH 7. This was repeated twice more to yield 650 mg. of a colorless powder which does not melt at 360°.

EXAMPLE 6

Preparation of 4-dimethylamino-6-hydroxy-1-pyrazolo-(3,4-d)-pyrimidine

This compound was prepared from 4-mercapto-6-hydroxy-1-pyrazolo-(3,4-d) pyrimidine in the same manner as the compound described in Example 5 by heating the starting material with an excess of dimethylamine (30% by weight in ethanol) for sixteen hours at 130°. The product crystallized from water in colorless needles.

EXAMPLE 7

Preparation of 4-amino-6-mercapto-1-pyrazolo-(3,4-d)-pyrimidine

To 650 mg. of 4,6-dimercapto-1-pyrazolo-(3,4-d) pyrimidine there was added 200 ml. of alcohol (saturated with ammonia at 0°). This mixture was heated in a sealed tube at 149° for 18 hours. The bomb contents were then allowed to evaporate to dryness on the steam bath. The residue was taken up in cold dilute hydrochloric acid solution and reprecipitated by the addition of sodium hydroxide to pH 7. The yield was 400 mg. of a colorless powder which did not melt below 320°.

The ultra-violet absorption spectrum at pH 1 gave maxima at 245, 255 and 295 mμ while at pH 11 the maxima were at 250, 275 and 290 mμ.

EXAMPLE 8

Preparation of 4-amino-1-pyrazolo-(3,4-d)-pyrimidine

To 1.0 gram of the above 4-amino-6-mercapto-1-pyrazolo-(3,4-d) pyrimidine there was added 20 ml. of concentrated ammonium hydroxide solution, 200 ml. of water and 5 grams of Raney nickel catalyst. The mixture was heated at reflux temperature for three hours and the solution filtered hot from the Raney nickel. The residual Raney nickel was extracted twice with 100 ml. portions of hot water and filtered. The combined filtrates were concentrated to dryness in vacuo and taken up in 200 ml. of hot ethanol. To the ethanol was added 10 ml. of 33% alcoholic hydrochloric acid and 500 ml. of ether. On standing for 24 hours, rosettes of colorless needles precipitated. These needles were recrystallized from 95% ethanol to give 4-amino-1-pyrazolo-(3,4-d) pyrimidine hydrochloride.

EXAMPLE 9

Preparation of 4-hydroxy-1-pyrazolo-(3,4-d) pyrimidine

One gram of above amino compound was placed in 100 ml. of 0.2 N sulfuric acid and warmed on the steam bath. To this was added a solution of 1.7 grams of potassium nitrile in 5 ml. of water. The mixture was then boiled for five minutes. The reaction mixture was cooled, brought to pH 5.5 by the addition of ammonium hydroxide solution and concentrated in vacuo to a volume of 20 ml. On standing in the cold for several hours, a precipitate formed which was recrystallized from boiling water to give a colorless powder which did not melt at 320°. This compound is 4-hydroxy-1-pyrazolo(3,4-d) pyrimidine.

EXAMPLE 10

4-hydroxy-6-methylmercaptopyrazolo-(3,4-d)-pyrimidine 4-hydroxy - 6 - mercaptopyrazolo-(3,4-d) pyrimidine (8.4 g.) was dissolved in 100 ml. of N sodium hydroxide solution and methyliodide (10 g.) was added dropwise with stirring over the course of one hour. The mixture was allowed to stir for an additional two hours at room temperature. After standing over night, the mixture was acidified with glacial acetic acid (10 ml.). The precipitated product was recovered by filtration. It did not melt when heated (to 320°).

EXAMPLE 11

6-amino-4-hydroxypyrazolo-(3,4-d)-pyrimidine

The above compound (5 g.) was dissolved in concentrated ammonium hydroxide (85 ml.) and heated under pressure at 140° for 16 hours, then cooled. The contents of the bomb were evaporated to dryness; the residue was dissolved in 10 ml. of warm 2 N hydrochloric acid, diluted to 20 ml. and filtered, then treated in the warm with a slight excess of concentrated ammonium hydroxide. The aminohydroxy compound was recovered by filtration, washed and eventually dried at 110° It did not melt when heated to 320°.

What is claimed is:

1. Compounds of the formula:

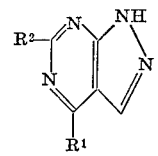

in which $R^1$ is selected from the class consisting of amino, hydroxy and mercapto provided that whenever $R^1$ is amino, $R^2$ is selected from the class consisting of hydrogen and mercapto and $R^2$ is selected from the class consisting of hydrogen, hydroxy, and mercapto.

2. Compounds of the formula

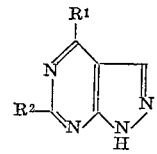

where $R^1$ is selected from the class consisting of hydroxyl and amino and $R^2$ is selected from the class consisting of hydroxyl and hydrogen, provided that whenever $R^1$ is amino, $R^2$ is hydrogen.

3. 4-amino-1-pyrazolo (3,4-d) pyrimidine.

4. A compound of the formula

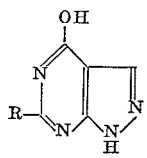

where R is selected from the class consisting of hydroxyl and hydrogen.

5. 4-hydroxy-1-pyrazolo (3,4-d) pyrimidine.

6. 4,6-dihydroxy-1-pyrazolo-(3,4-d) pyrimidine.

7. A compound of the formula

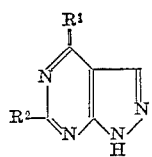

where R¹ is selected from the class consisting of amino and mercapto and R² is selected from the class consisting of mercapto and hydrogen.

8. 4-amino-6-mercapto-1-pyrazolo-(3,4-d) pyrimidine.
9. 4,6-dimercapto-1-pyrazolo-(3,4-d) pyrimidine.
10. 4 - mercapto - 6 - hydroxy - 1 - pyrazolo-(3,4-d) pyrimidine.

No references cited.

ALEX MAZEL, Primary Examiner

R. J. GALLAGHER, Assistant Examiner

U.S. Cl. X.R.

260—256.4, 310, 999

Dedication 3,474,098.—*George H. Hitchings*, Yonkers and *Elvira A. Falco*, New Rochelle, N.Y. PYRAZOLO-(3,4-d)PYRIMIDINES. Patent dated Oct. 21, 1969. Dedication filed May 4, 1978, by the assignee, *Burroughs Wellcome Co.*

Hereby dedicates to the Public the remaining term of said patent.

[*Official Gazette October 24, 1978.*]